United States Patent Office.

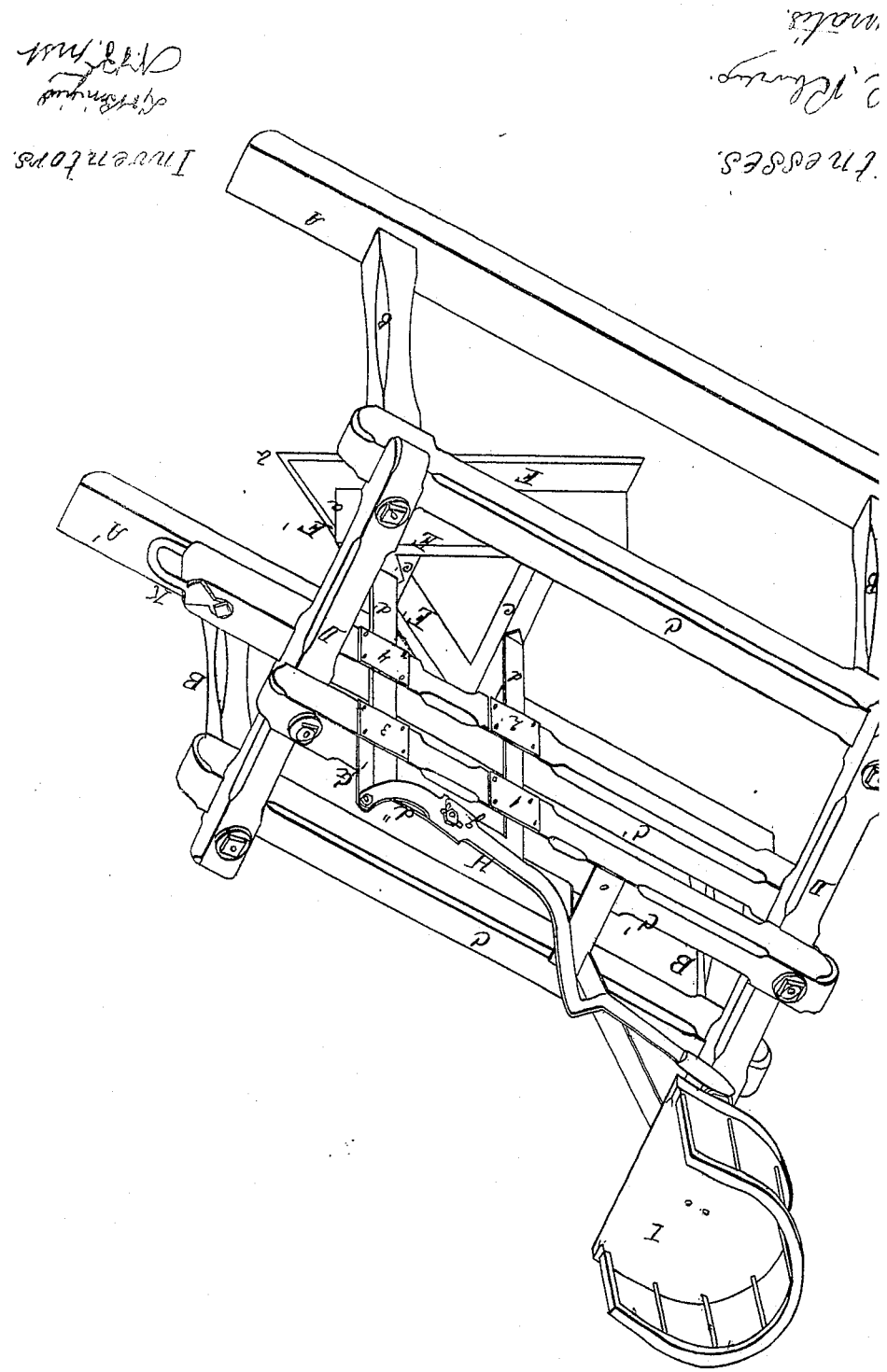
L. J. Bringier & N. B. Trist.
Cane Scraper
Patented July 13. 1869.
94.20.

L. A. BRINGIER, OF ASCENSION PARISH, AND N. B. TRIST, OF NEW ORLEANS, LOUISIANA.

Letters Patent No. 92,420, dated July 13, 1869.

IMPROVEMENT IN CANE-SCRAPER.

The Schedule referred to in these Letters Patent and making part of the same.

*To all whom it may concern:*

Be it known that we, L. A. BRINGIER, of the parish of Ascension, State of Louisiana, and N. B. TRIST, of the city of New Orleans, in the same State, have jointly invented a certain new, useful, and improved Cane-Scraper; and we do hereby declare the following to be a full, clear, and exact description of the same, reference being had to the annexed drawing, making a part of this specification, whereon it is clearly shown and illustrated by a perspective view.

In order the more clearly to understand the value and importance of our invention, it is proper, before proceeding to describe its construction and mode of operation, to advert to the fact, that in the culture of sugar-cane, the seed, which consists of cane of full size laid lengthwise, in parallel trenches or furrows, is put into the ground or planted in winter, and covered with earth to a depth of from four to six inches, in order to prevent the injurious effects of cold and frost, to which the plant, from its organic nature, is peculiarly sensitive.

With the opening of the spring, this heavy overlying mass of earth is removed, as far as possible, without exposing the plants, in order, under the influence of the sun, to quicken the process of germination, and, at the same time, to permit the young shoots at once to show themselves above the ground. But before this is done, the rows are "barred off," as it is called, by running proper plows on each side of them, and throwing the earth from them, so that the said rows present a series of parallelograms of from four to eight inches in height, and from twelve to sixteen inches in width.

After thus barring off the rows, the operation of reducing the thickness of the protective winter-covering on the seed-cane is called "scraping," in the technical parlance of the sugar-regions, and it is always desirable that it should be performed in such manner as to secure, as nearly as practicable, the leaving of a very thin but uniform or equal covering everywhere throughout the field, for the obvious object of having a simultaneous germination and coming up of the plants, and a uniformity of growth everywhere therein.

Efforts have been made to create a machine, to be drawn by animals, to effect this necessary operation, but hitherto they have not been successful, chiefly in consequence of the absence of any provision, in the machines that have been tried, to adapt them to the slight inequalities alike in the surface of the ground and in the depth of the seed beneath the same, that must inevitably obtain in the most level fields, and notwithstanding the exercise of the greatest possible care in planting. Not being instantaneously adjustable, nor, in fact, adjustable at all to the varying surface of the field and height of the rows, such machines in practice were utterly impracticable and worthless, if for no other reason, than because at frequent intervals they would run under the canes and throw them out of their beds, if they did not break up and ruin them.

Nor were any of the scraping-machines thus tried and found to be worthless, calculated to cut away the grass, weeds, &c., which, with the advent of the warm cane-germinating season, make their appearance, and grow with incredible luxuriance; and they accordingly were defective in this regard, equally as in a capability of fulfilling the specific object for which they were designed.

The operation of scraping, therefore, has to be performed with the hoe, which, in the present condition of things in the sugar-regions of the United States, but especially in view of the insufficient number of laborers now procurable, involves too great an expense to be borne by the planter, as well as too great a loss of time.

Our invention remedies the defects of the machines hitherto made, and hence supplies a crying want, and by so doing is of very great value.

It consists of a pointed-winged scraper and grass-cutter, that is so mounted and secured in a frame, supported on parallel runners or slides, as to be readily adjusted and controlled, by the driver of the machine, by means of a lever, that is connected with it by intermediate mechanial parts, particularly adjusted or arranged with reference to the attainment of that end, whilst the scraper is especially adapted to the form of the rows that have been barred off, and to the accomplishment of our object of reducing the covering of earth to a thin stratum of equal or nearly equal thickness, from one end of the rows to the other, everywhere in the field.

But our invention will be better understood by referring to the drawing.

On the drawing—

A A' represent two parallel runners or slides, placed sufficiently wide apart to straddle the widest row of planted cane, on which a frame, consisting of the vertical standards or corner-pieces B, longitudinal pieces or bars C C' C", and transverse bars D D', are strongly and permanently secured and supported, substantially as shown on the drawing.

The runners extend a short distance beyond the frame, at the front end thereof, to give steadiness to the machine when in operation, whilst the longi udinal bars C' C" are placed midway, or thereabout, between the side bars C, and are strongly secured, by bolts, to the under and upper sides, respectively, of the cross-bars D D', in such manner that C' is precisely over C", as delineated.

Our scraper consists of two vertical sections E E', that are united at their front extremities, so as to form a point, *a*, from which they diverge outwardly sufficiently to cover the widest cane-row by their combined divergence, the angle of each being, with respect to a central line between them, about twenty-five degrees; and two diverging blades or knives F F', also united, so as to form a sharp front point at $b$, which are secured to the bottoms of parts E E', so as to project outwardly therefrom.

The sections E E' being placed edgewise, with relation to the ground, serve as mould-boards to throw off the earth, grass, &c., in the practice of the machine, whilst the knives F F', being at right angles thereto, and hence horizontal or parallel to the surface of the ground, and divergent from each other, from the point $b$, rearwards, cut the roots of grass, weeds, &c., by a shear-like operation, and, therefore, with the greatest possible facility.

Between the two sections E E', two cross-timbers $c$ $c'$ are introduced and strongly fastened, to strengthen the scraper and provide a means of connection with the bracket $d$ $d'$ $d''$, $d$ $d'$ being perpendicular sections of the same, whilst $d''$ is the central horizontal section at the top of the bracket, as shown.

The lower extremities of the two vertical parts or arms $d$ $d'$ of the bracket, are strongly secured to the cross-timbers $c$ $c'$, at the centres thereof, by any proper means, and these arms being placed in vertical recesses, cut on the sides of the longitudinal bars C' C'' of the frame, so made as to allow the said arms to move freely up and down through the same, and secured therein by covering-plates 1, 2, 3, 4, establish a connection between the scraper and the frame-work, which is immovable in every direction except upwardly and downwardly.

To an upright standard, G, that is placed substantially, in relation to the bracket $d$ $d'$ $d''$, as shown on the drawing, a lever, H, which extends back to the driver's seat, and on the right side thereof, is pivoted, as seen.

The lever H, being connected to the bracket $d$ $d'$ $d''$ by means of an elongated aperture or slot, $g$, in the former, and a projecting pin, $e$, at the centre of the horizontal part $d''$ of the said bracket, affords a ready and a most convenient means by which the driver, sitting on the seat J, may elevate and depress the scraper, and control it precisely as he pleases. Holding the lever in his hand, he will always know when the point of the scraper comes in contact with the buried cane, and, by a slight movement of his hand, instantly elevate the former, and thus avoid throwing out the cane from its bed.

In fact, we have demonstrated, by the actual use of a full-sized machine in the field, that the driver can so completely control the scraper that he may not only avoid this difficulty, but he can with absolute certainty scrape off the earth to any prescribed point above the cane, short of an actual exposure of the same.

The team is attached to the machine by means of a clevis, K, that is secured to the front end of bar C''.

The seat J may be fixed on the machine in the position and by the means shown, or in any other equally convenient place, and by any other appropriate means.

Indeed, all the parts of our invention may be, to some extent, modified, without affecting the principle of its operation.

Having thus described our invention,

What we claim, and desire to secure by Letters Patent, is—

1. The scraper herein described, when provided with a bracket, $d$ $d'$ $d''$, in combination with the vertical standard G and the lever H, when these several parts are constructed, and arranged, and operate substantially as herein described, for the purpose set forth.

2. The above combination in combination with a suitable frame, to which the parts are secured, substantially as herein described.

L. A. BRINGIER.
N. B. TRIST.

Witnesses:
RUFUS R. RHODES.
E. TOMATIS.